US006895443B2

(12) United States Patent
Aiken

(10) Patent No.: US 6,895,443 B2
(45) Date of Patent: May 17, 2005

(54) METHOD AND SYSTEM FOR FACILITATING COMMUNICATION BETWEEN NODES ON DIFFERENT SEGMENTS OF A NETWORK

(75) Inventor: Mark A. Aiken, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 727 days.

(21) Appl. No.: 10/002,910

(22) Filed: Nov. 2, 2001

(65) Prior Publication Data

US 2003/0088700 A1 May 8, 2003

(51) Int. Cl.[7] .............................................. G06F 15/16
(52) U.S. Cl. ........................ 709/245; 709/217; 370/389
(58) Field of Search ................................ 709/238, 232, 709/217, 230, 227, 245; 370/389, 401, 395.54, 469

(56) References Cited

U.S. PATENT DOCUMENTS

| | | | |
|---|---|---|---|
| 6,625,709 B2 * | 9/2003 | Aiken et al. ................ | 711/170 |
| 6,747,979 B1 * | 6/2004 | Banks et al. ................ | 370/401 |
| 6,775,278 B1 * | 8/2004 | Britton et al. .............. | 370/389 |

OTHER PUBLICATIONS

Dave Thaler, Christian Huitema; Multi–link Subnet Support in IPv6; Internet–Draft Memo; May 14, 2001; 15 pp.; Network Working Group.

Chapter 4, ARP: Address Resolution Protocol; Jul. 14, 2001, pp. 1–10.

Anthony Northrup; NT Network Plumbing: Routers, Proxies, and Web Services; 1998; pp. 539–541; IDG Books Worldwide, Inc., Foster City, CA.

Regis J. (Bud) Bates, Donald W. Gregory; Voice and Data Communications Handbook; 1998; pp. 474–475; The McGraw–Hill Companies, Inc.; New York, NY.

Peter Norton, Dave Kearns, Peter Norton's® Complete Guide to Networking; 1999; p. 161; Sams, a Division of MacMillan Computer Publishing; Indianapolis, IN.

Bob Edwards; ProxyARP Subnetting HOWTO; http://new.linuxnow.com/docs/content/Proxy–ARP–Subnet/Proxy–ARP–Subnet.html; Aug. 1997; 7 pp.

Ilia Mirkin, http://www.tjhsst.edu/~imirkin/syslabbook/node5.html; Jun. 11, 2001, 2 pp.

* cited by examiner

*Primary Examiner*—Kamini Shah
(74) *Attorney, Agent, or Firm*—Leydig, Voit & Mayer, Ltd.

(57) ABSTRACT

A method and system allows nodes on different segments to communicate with one another as if they were on a single segment. In one implementation, an intermediate computer linked in communication with the different segments relays data between the nodes and selectively substitutes the hardware addresses of its own network interface cards for the hardware addresses of the nodes themselves. The nodes are then able to communicate with one another using hardware addresses of the intermediate computer while still using their own network addresses.

20 Claims, 6 Drawing Sheets

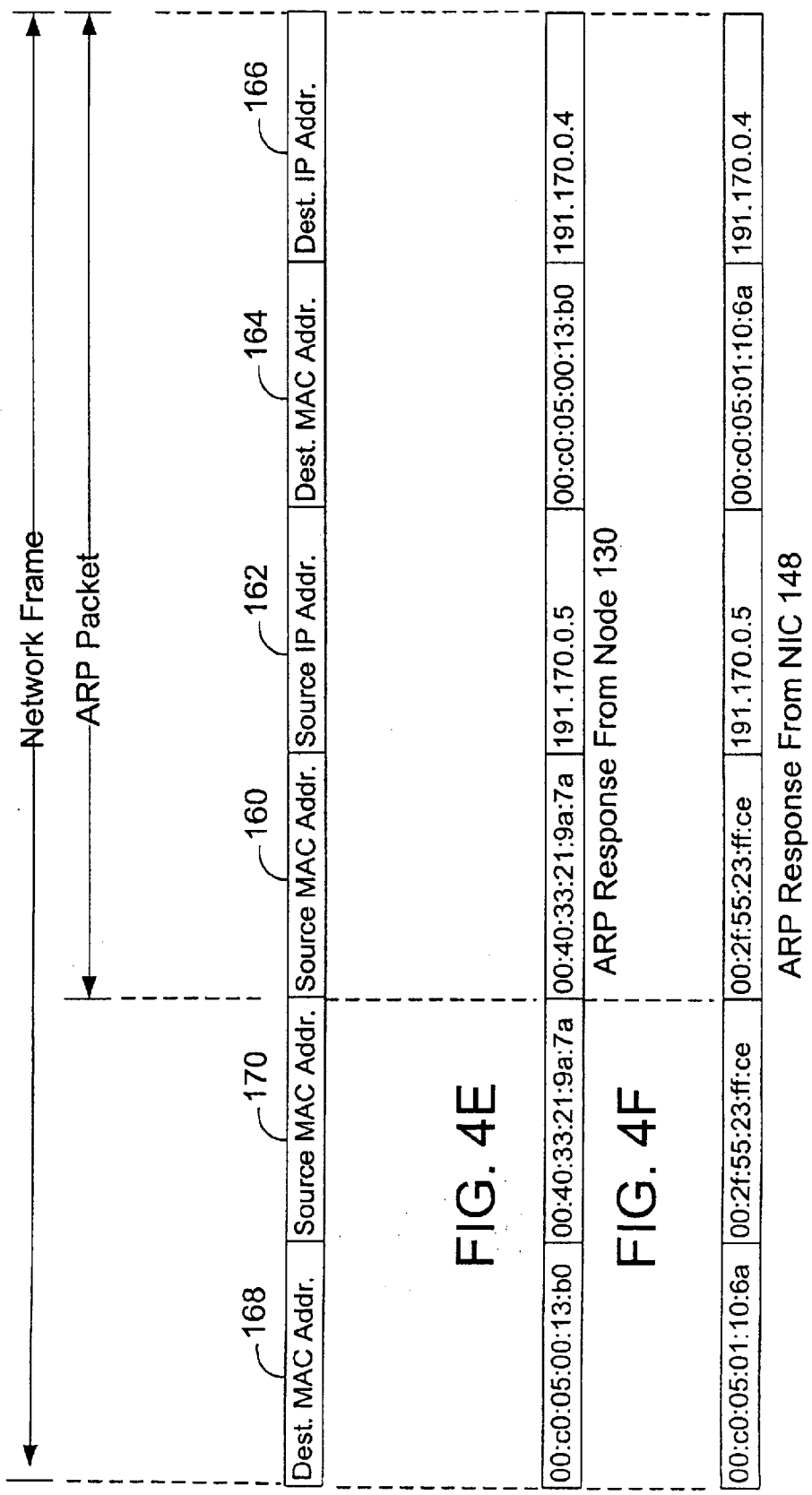

METHOD AND SYSTEM FOR FACILITATING COMMUNICATION BETWEEN NODES ON DIFFERENT SEGMENTS OF A NETWORK

TECHNICAL FIELD

The invention relates generally to network communication and, more particularly, to methods and systems for facilitating communication between nodes on different segments of a network.

BACKGROUND OF THE INVENTION

The decreased price of computers has resulted in their increased ownership. As a result, it is no longer uncommon for a household to own multiple computers of varying types, including desktops, laptops and handheld devices. Sharing resources between two or more of these different types of computers is often desirable. For example, an individual using a laptop computer may wish to use a printer or a high speed internet connection that is only accessible through his or her desktop computer. One way to facilitate the sharing of resources among the various computers of a household is to communicatively link the computers together into a network.

When computers communicate with one another over a network, they send and receive information in the form of network frames. Address information is embedded within each frame so that it can reach the proper destination or target computer. For example, the frame header typically includes a source and a destination hardware address to enable the destination computer to identify frames for which it is the intended recipient. Each frame contains a packet of data. The packet of data within the frame may also contain address information, such as a source and a destination network address.

Generally, before a first network device (the source device) can transmit network frames to a second network device (the destination device), the source device needs to have access to the hardware and network address of the destination device. The source device can access the network address of the destination device using various name resolution schemes that allow a human readable machine name to be converted into a network address. Such resolution schemes are known in the art and need not be described further herein. After the network address of the destination device is known, the source device must also gain access to the hardware address of the destination device.

One method for the source device to gain access to the hardware address of the destination device is to send a broadcast message such as provided for by the Address Resolution Protocol (ARP). However, because the broadcast ARP message must include the network address of the destination device, it can only be used after the source device gains access to the destination device's network address as previously described.

In general, all devices on a given network segment are able to receive broadcast network frames. Thus, the destination device can receive a broadcast ARP message even though its hardware address is not included in the frame header. When the destination device receives the ARP message, it responds to the source device with another ARP message that includes the hardware address of the destination network device. In this manner, the source device gains access to the hardware address of the destination device so that the source device can transmit properly addressed frames to the destination device.

In a simple network configuration, all devices are located on a single network segment. For example, two computers, each with its own interface card, may be physically connected to one another with a 10Base-T cable using Ethernet technology. Communication between two computers on a single network segment is relatively straightforward. One computer can send a network frame to the other computer by providing the frame with a header that includes the hardware address of the other computer onto the network segment, e.g. a 10Base-T cable. Because the two computers are physically interconnected, the destination computer's interface card receives the network frame. Furthermore, because the destination hardware address matches its own, the destination accepts and processes the network frame.

If the source computer does not have access to the hardware address of the intended destination computer, the source computer determines the destination computer's network address if it is not already known and sends a broadcast network frame over the network segment with an ARP message as described above. Once again, because the two computers are physically located on the same network segment, the destination computer's interface card sees the broadcast message and replies to the source computer with an ARP response containing the destination computer's hardware address. After this process is complete, the source computer can send network frames specifying the proper destination computer hardware address to the destination computer.

Configuring a network so that all network devices are linked to a single segment is not always possible or even desirable. This is especially true if more than one physical communication medium is being used. For example, a consumer may own a laptop computer as well as two desktop computers, and may wish to organize them into a network. The user may wish to have the first desktop computer connected to a broadband internet connection, thereby acting as a gateway, and have the second desktop computer connected to the first desktop computer via an Ethernet cable. The user may wish to have the laptop communicate with the first desktop computer via an 802.11b wireless link. Thus, the first desktop computer may have to have two network interfaces, one for the 802.11b connection to the laptop and a second for the wired Ethernet connection to the second desktop computer. The end result is a multi-segmented network.

Multi-segment networks require additional software and/or hardware to relay data between different segments. Without such hardware and/or software, a destination device on one segment would not be able to receive data from a network device on another segment. Internet Protocol (IP) routing provides one way to relay data between different segments. In IP routing, each network segment is assigned a unique subnet number. This unique subnet number is included as part of the network address of each network device. The subnet number allows a source device to determine whether a destination device is located on another network segment. If the destination device is located on another network segment, the source device transmits the packet of data to a router, which is located at the junction of the two subnets. The router forwards the packet of data to the destination device. The drawback of using IP routing is that it requires the user to perform various configuration tasks, such as assigning unique subnet numbers to the network segments. Unfortunately, it is difficult for the average user to implement this method in his or her home network.

Conventional bridging is another technique that can be used to interconnect multiple network segments. A bridge is a computer or other network device that receives the network frames transmitted over one network segment and retransmits them over the other network segments such that the frames are unaltered, i.e. contain the same hardware source and destination addresses. In this manner, a network frame will eventually reach the proper destination device. Because the bridge has to retransmit the frame with the original source hardware address, the network interface on the bridge must be capable of transmitting an arbitrary source hardware address, i.e. a source hardware address other than its own. In addition, the network interface of the bridge must be able to receive network frames having destination hardware addresses other than its own. The capability of receiving multiple hardware addresses is often referred to as a promiscuous receive mode. However, promiscuous receive mode and arbitrary source address transmission are difficult or impossible to implement on some types of network technologies, such as 1394 or 802.11b wireless.

SUMMARY OF THE INVENTION

In accordance with the foregoing, a method and system for facilitating communication between nodes on different segments of a network is provided. The invention allows nodes on different segments to communicate with one another as if they were on a single segment. The invention accomplishes this by relaying messages between the different nodes and selectively substituting the hardware addresses of its own network interface cards for the hardware addresses of the nodes themselves. In one implementation of the invention, a computer network includes a computer, referred to as an "intermediate computer," that has multiple network interface cards, each of which is in communication with a different segment of the computer network. If a node on one segment of the network, referred to herein as the "source node," wishes to communicate with a node on another segment of the network, referred to as the "destination node," and if the source node has the IP address of the destination node, but not its hardware address, the source node needs to broadcast a request for the hardware address of the destination node. The request is received by the intermediate computer, which is in communication with the network segment of the source node via one of its network interface cards. The intermediate computer sends a modified version of the request to each of the other network segments to which it is communicatively linked. Specifically, for each of its network interface cards, the intermediate computer modifies the request by replacing the source hardware address contained in the request (which is initially the hardware address of the source node) with the hardware address of the network interface card, while leaving the source IP address unchanged.

When the request reaches the destination node, the destination node responds as if the intermediate computer is the originator of the request, and gives the intermediate computer its hardware address. The intermediate computer modifies the response in the same way that it modified the original request and sends the modified response in unicast mode to the source node. The source node now treats the intermediate computer as if it has the IP address of the destination node. The destination node, likewise, treats the intermediate computer as if it has the IP address of the source node. The intermediate computer keeps track of the IP address and hardware address of both the source and destination nodes and relays data back and forth between them.

The invention allows network nodes of different segments to communicate with one another without the need for setting up an IP routing scheme. The invention does not require the use of network interface cards that have the ability to receive all hardware addresses (so-called "promiscuous receive") nor does it require the use of network interface cards that generate arbitrary hardware addresses. Additional features and advantages of the invention will be made apparent from the following detailed description of illustrative embodiments that proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

FIGS. 4A–4F illustrate the structure of example network frames that may be transmitted in the network of FIG. 3 according to an embodiment of the invention.

DETAILED DESCRIPTION OF THE INVENTION

The invention is generally directed to a method and system for facilitating communication between two or more network segments, in which communication frames passing between the segments are modified by an intermediate computer so as to make it appear to all of the nodes on the two segments that they are on the same segment. In an embodiment of the invention, when a source node on a first network segment requests the hardware address of a destination node on a second segment, the intermediate computer responds to the request by transmitting the hardware address of the intermediate computer to the source node. As a result, network frames subsequently transmitted by the source node to the destination node will specify the destination hardware address of the intermediate computer. The intermediate computer can then relay the frames from the source computer to the destination computer. The invention helps enable a user to set up a multi-segment network with minimal expertise.

Although it is not required, the present invention may be implemented by program modules that are executed by a computer. Generally, program modules include routines, objects, components, data structures and the like that perform particular tasks or implement particular abstract data types. The term "program" as used herein may connote a single program module or multiple program modules acting in concert. The invention may be implemented on a variety of types of computers, including personal computers (PCs), hand-held devices, multi-processor systems, microprocessor-based programmable consumer electronics, network PCs, minicomputers, mainframe computers and the like. The invention may also be employed in distributed computing environments, where tasks are performed by remote processing devices that are linked through a communications network. In a distributed computing environment, modules may be located in both local and remote memory storage devices.

Figure 1:
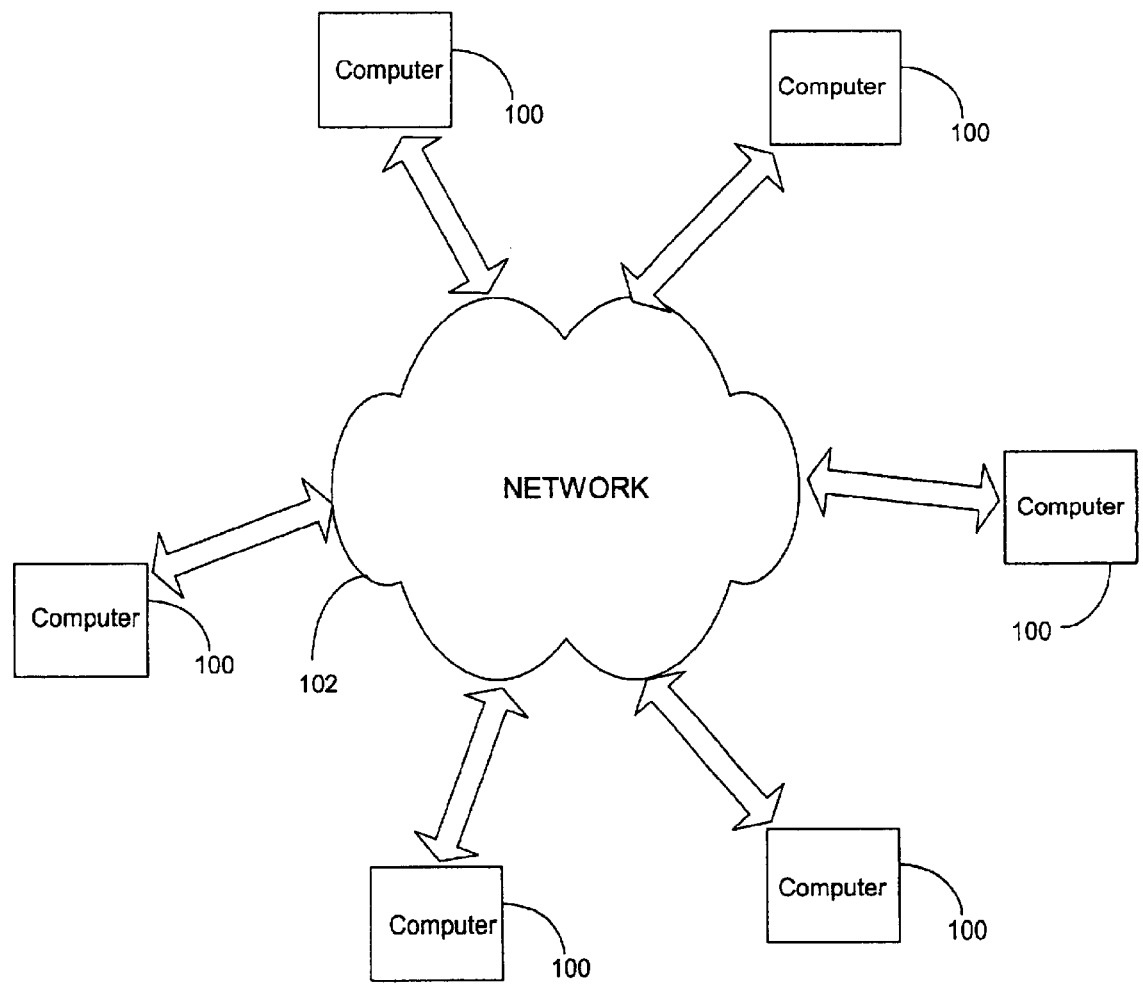
FIG. 1 is an example of a computer network environment in which the invention can be implemented.

An example of a networked environment in which this system may be used will now be described with reference to FIG. 1. The example network includes several computers 100 communicating with one another over a network 102, represented by a cloud. Network 102 may include many well-known components, such as routers, gateways, hubs, etc. and may allow the computers 100 to communicate via wired and/or wireless media.

Figure 2:
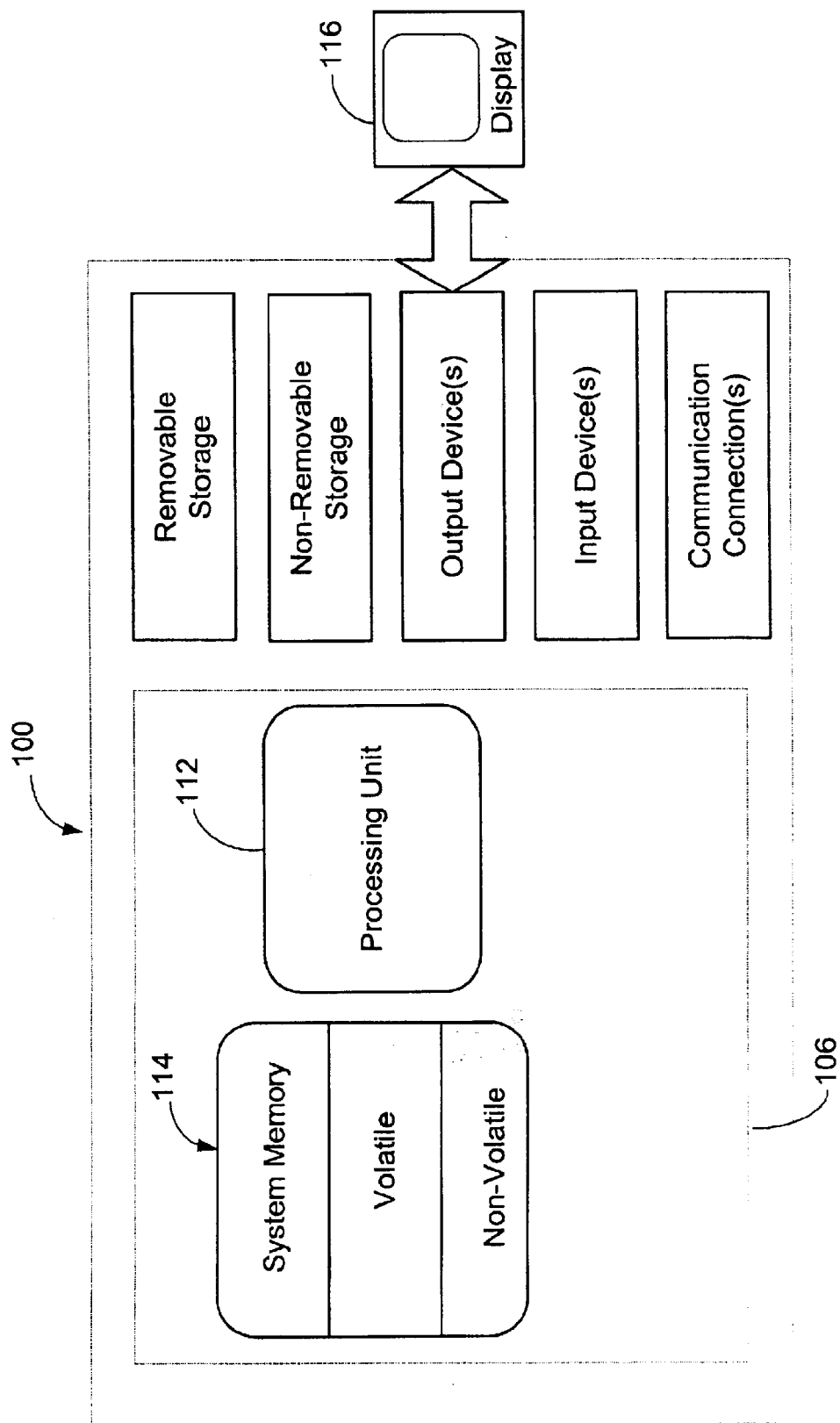
FIG. 2 is an example of a computer on which the invention can be implemented.

Referring to FIG. 2, an example of a basic configuration for a computer on which the system described herein may be implemented is shown. In its most basic configuration, the computer 100 typically includes at least one processing unit 112 and memory 114. Depending on the exact configuration and type of the computer 100, the memory 114 may be volatile (such as RAM), non-volatile (such as ROM or flash memory) or some combination of the two. This most basic configuration is illustrated in FIG. 2 by dashed line 106. Additionally, the computer may also have additional features/functionality. For example, computer 100 may also include additional storage (removable and/or non-removable) including, but not limited to, magnetic or optical disks or tape. Computer storage media includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to stored the desired information and which can be accessed by the computer 100. Any such computer storage media may be part of computer 100.

Computer 100 may also contain communications connections that allow the device to communicate with other devices. A communication connection is an example of a communication medium. Communication media typically embodies computer readable instructions, data structures, program modules or other data in a modulated data signal such as a carrier wave or other transport mechanism and includes any information delivery media. By way of example, and not limitation, communication media includes wired media such as a wired network or direct-wired connection, and wireless media such as acoustic, RF, infrared and other wireless media. The term computer readable media as used herein includes both storage media and communication media. The communication connection may include one or more network interfaces, such as network interface cards (NICs).

Computer 100 may also have input devices such as a keyboard, mouse, pen, voice input device, touch input device, etc. Output devices such as a display 116, speakers, a printer, etc. may also be included. All these devices are well known in the art and need not be discussed at length here.

Figure 3:
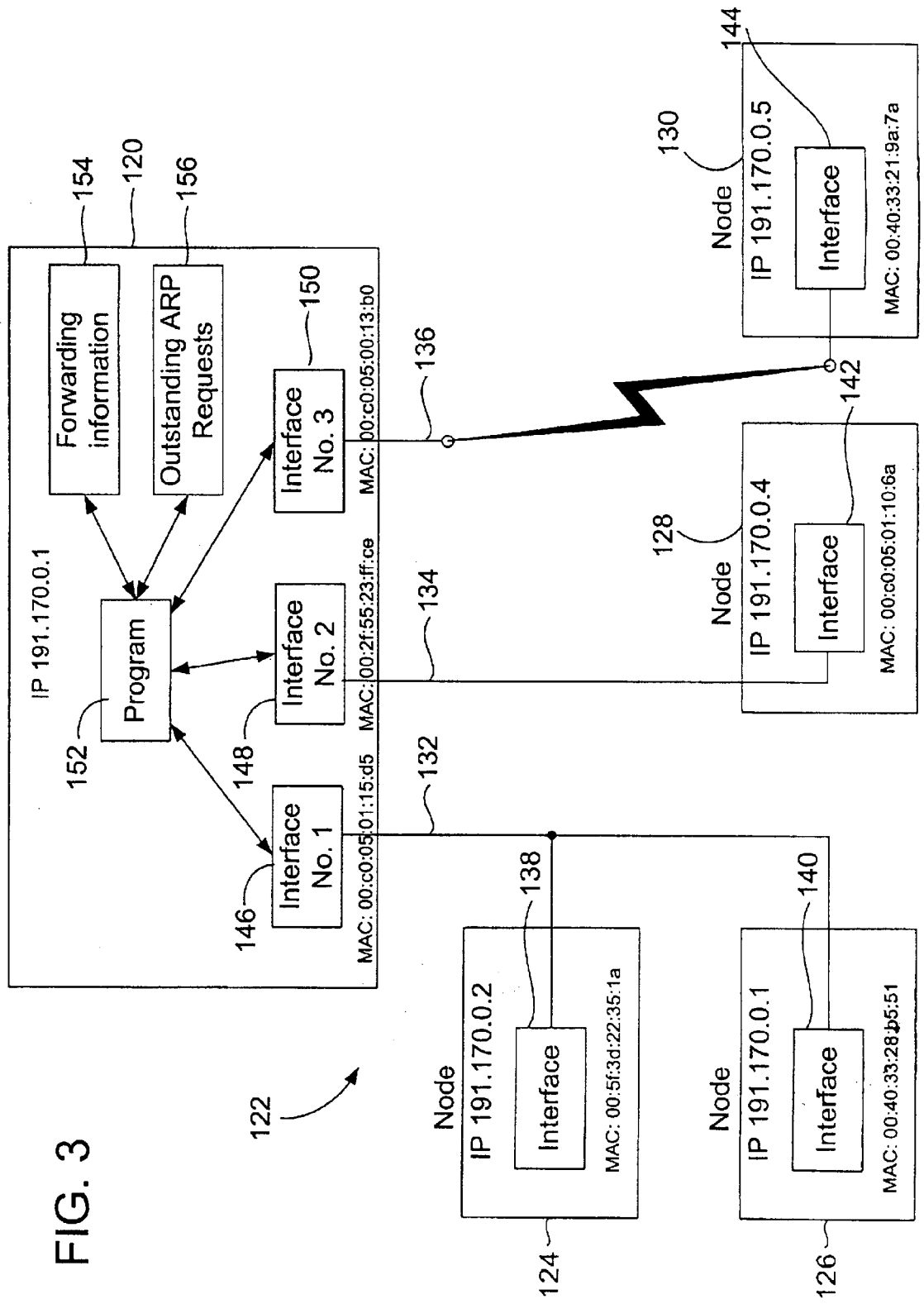
FIG. 3 is an example of a multi-segmented network on which an embodiment of the invention is implemented.

A multi-segmented network on which an embodiment of the invention is implemented is shown in FIG. 3. An intermediate computer, generally labeled 120, is shown operating within the network, generally labeled 122. The network 122, also includes a plurality of network nodes 124, 126, 128 and 130 that are linked to the intermediate computer 120 via network segments 132, 134 and 136. The computer 120 executes a communication program 152 that has access to a first data structure 154 for maintaining forwarding data for the network 122 and a second data structure 156 for maintaining data regarding outstanding Address Resolution Protocol (ARP) requests. The functions of the communication program 152 and the data structures 154 and 156 will be described below in further detail.

The intermediate computer 120 and each of the nodes 124, 126 128 and 130 may be implemented as any suitable computing device such as personal computers, servers, handheld devices, printers, switches, routers, bridges, repeaters or the like. Each network segment may be implemented using any suitable technology, for example, Ethernet, 1394 or 802.11b, although the segments 132 and 134 are assumed, for the sake of example, to be wired while the segment 136 is assumed to be wireless. A limited number of network nodes are shown in FIG. 3. However, it will be understood that each network segment may contain as many network nodes as the technology employed will support. It should further be understood that the intermediate computer 120 operates as a node of the network 122.

Referring again to FIG. 3, each node is identified by a unique network (IP) address and a unique hardware or Media Access Control (MAC) address. In the example shown, the IP addresses are four byte addresses represented in dotted decimal form and MAC addresses are six byte addresses represented in hexadecimal form. For example, the node 130 has an IP address of 191.170.0.5 and a MAC address of 00:40:33:21:9a:7a. Each of the nodes 124, 126, 128 and 130 has its own network interface card (NIC), which are labeled 138, 140, 142 and 144 respectively. Each of the NICs is linked to a segment of the network 122. For example, the NICs 138 and 140 are linked to the network segment 132, while the NIC 142 linked to the network segment 134, and the NIC 144 is linked to the network segment 136.

In the example shown, the intermediate computer 120 has an IP address of 191.170.0.1. The intermediate computer 120 has a plurality of NICs 146, 148 and 150, which are identified internally (by software running on the intermediate computer 120) as Number 1, Number 2 and Number 3, respectively. Each of the NICs 146, 148 and 150 is used to link the intermediate computer 120 to a different segment of the network 122. For example, the NIC 146 is linked to the segment 132 and has a MAC address of 00:c0:05:01:15:d5; the NIC 148 is linked to the network segment 134 and has a MAC address of 00:2f:55:23:ff:ce; and the NIC 150 linked to segment 136 and has a MAC address of 00:c0:05:00:13:b0.

Each node 124, 126, 128 and 130 communicates with other network nodes by sending network frames onto the segment to which it is linked. Each network frame includes a payload of data embedded in an IP packet. In addition to containing the data, the IP packet further contains a header with the IP address of the node transmitting the packet (source node) and the IP address of the intended recipient of the packet (destination node). The network frame contains its own header that includes the source and destination MAC addresses. The network frame may contain additional fields such as a preamble, length/type or frame check sequence field.

When a node of the network 122 receives a frame, it compares the destination MAC address in the frame header to its own MAC address. If the MAC addresses do not match, and the destination MAC address is not the broadcast address, the node does not process the payload or data embedded within the frame. Conversely, if the MAC addresses do match, or if the destination MAC address is the broadcast address, the node processes the payload or data embedded in the frame. Thus, for a network frame to be received and processed by the intended destination node, the network frame should be (1) transmitted to the destination node's segment and (2) should include the MAC address of the destination node or the broadcast MAC address. If a source node does not have access to the destination node's MAC address, the source node attempts to obtain it through the use of the Address Resolution Protocol (ARP) request. An ARP request is a message that is broadcast so that it is received by all NICs on the segment of the source node. An ARP request contains the IP address of the destination node. If the destination node receives the ARP request, it is supposed to recognize the IP address as belonging to it and respond to the ARP request by sending, to the source node, an ARP response packet that contains the destination node's MAC address.

According to the present invention, the intermediate computer 120 facilitates communication between nodes located on different network segments by detecting an ARP requests from one of the nodes and re-broadcasting it throughout the network 122 so that it appears to have originated from the intermediate computer 120. When the destination node responds with its MAC address, the intermediate computer 120 keeps track of the IP address and MAC address of the destination computer and uses this information to forward frames to and from the destination node. This allows both the source and destination nodes to communicate with one another via the intermediate computer 120 without realizing that they are, in fact, on different segments of the network 122.

An example of how the intermediate computer 120 facilitates communication between the various network segments will now be described with reference to FIGS. 3 & 4A–F. For the purpose of illustrating the invention, it is assumed that data is to be sent from the node 128 to the node 130. It is further assumed that the node 128 has access to the IP address of node 130 but not its MAC address.

To ascertain the MAC address of the node 130, the node 128 sends a broadcast network frame as shown in FIG. 4A. The broadcast network frame includes an ARP request packet containing a field 162 for the source IP address, a field 160 for the source MAC address, a field 166 for the destination IP address and a field 164 for the destination MAC address. Referring to FIG. 4B, the frame from the node 128 in this example includes a source IP address of 191.170.0.4, a source MAC address of 00:c0:05:01:10:6a and a destination IP address of 191.170.0.5. Since the destination MAC address is unknown, that field is left unfilled. The ARP packet format shown is simplified for the purpose of illustrating the present invention and it will be understood that the ARP packet may contain additional fields, such as an operation field designating whether the ARP packet is an ARP request or an ARP reply.

Referring again to FIG. 4A, the ARP packet is further wrapped into a network frame containing a header with fields 170 and 168 respectively for the source MAC address and destination MAC address. As shown in FIG. 4B, the frame from the node 128 has a source MAC address field that contains the MAC address of node 128. The destination MAC address field is set to ff:ff:ff:ff:ff:ff, which designates the network frame as a broadcast frame that all nodes connected to the network segment 134 will receive and process.

Once the broadcast network frame containing the ARP request is transmitted by the node 128 over the segment 134 it is received by the intermediate computer 120 via the NIC 148. The NIC 148 removes the network frame fields 168 and 170 and passes the ARP request to the communication program 152. The communication program 152 creates an entry in the second data structure 156 indicating the MAC address and IP address of the node that sent the ARP request, as well as which interface received the request. In this case, the entry includes the MAC address and IP address of the node 128 and the interface number 2 (corresponding to the NIC 148). The communication program 152 also modifies the ARP request and sends the modified version of the ARP request to all of the network segments other than the one from which the ARP request was originally received. In this example, the communication program 152 sends the modified versions of the ARP request over the network segments 132 and 136.

The modified ARP requests sent by the intermediate computer 120 are the same as the ARP request sent by the source node 128, except the intermediate computer 120 substitutes a source MAC address corresponding to the intermediate computer NIC linked to the segment over which the modified ARP request is sent. In the present example, the communication program 152 sends a modified ARP request over the NIC 146 and over the NIC 150. The NIC 146 and NIC 150 wrap the modified ARP requests into network frames and transmit them onto segments 132 and 136. FIGS. 4C and 4D show the modified ARP requests sent from the intermediate computer 120 to network segments 132 and 136. The network frame headers includes a destination MAC address that identifies each frame as a broadcast network frame. The destination IP address in each ARP packet remains that of the intended destination node 130 and the original source IP address of node 130 is likewise preserved in the source IP address ARP packet fields. The source MAC address in each ARP packet, however, has been modified by the communication program 152 (FIG. 3) to match that of the intermediate computer NIC linked to the segment over which the ARP request is sent. For example, the source MAC address for the ARP request sent over segment 136 (FIG. 3) has been changed to 00:c0:05:00:13:b0 which corresponds to the NIC 150. The source MAC addresses in the network frame header have also been changed to match that of the NICs linked to the network segments 132 and 136. Because each NIC of the intermediate computer 120 uses its own address in the source field of the network frame, it does not need to be capable of providing an arbitrary source address.

Referring again to FIG. 3, the nodes 124, 126 and 130 each receive the ARP request from the intermediate computer 120. The nodes 124 and 126 do not respond, since the destination IP address specified in the ARP request does not match their own IP addresses. The node 130, in contrast, does respond since the specified destination IP address matches its own IP address. FIG. 4E shows the ARP response from node 130. The ARP response frame header specifies a destination MAC address of 00:c0:05:00:13:b0, which is the MAC address of the NIC 150 and the destination IP address of the node 128.

The communication program 152 receives the ARP response packet via the NIC 150 and creates an entry in the first data structure 154. The entry associates the IP address of the node 130 with the MAC address of the node 130, and also indicates the interface over which messages are to be sent to the node 130 (interface number 3). The communication program 152 references the second data structure 156 and matches the ARP response with the ARP request received from the source node 128.

The communication program 152 modifies the ARP response by changing the source MAC address from 00:40:33:21:9a:7a, which is the MAC address of the node 130, to 00:2f:55:23:ff:ce, which is the MAC address of the NIC 148 of the intermediate computer 120. Thus, even though the intermediate computer 120 has obtained the actual MAC address of the destination node 130, it provides the source node 128 with a MAC address of a NIC linked to the same segment as the source node 128.

Once the node 128 has received a MAC address for the node 130, the node 128 stores data that relates the MAC address of the NIC 148 with the IP address of the node 130. The data is stored in a memory location that is known as an "ARP cache" and whose functionality is well-known. By referencing the ARP cache, the node 128 can transmit data to the node 130 by wrapping it into IP packets with the destination IP address of 191.170.0.5 and wrapping the IP packets into network frames having a destination MAC address of 00:2f:55:23:ff:ce. Because this MAC address corresponds to NIC 148, the intermediate computer 120 receives the frames. The communication program 152 retransmits these frames to the node 130 with a destination MAC address of 00:40:33:21:9a:7a. The communication program 152 also updates the forwarding information in the data structure 154 to indicate that a communication session is taking place between the node 128 and the node 130. When the node 130 transmits data to the node 128, it wraps the data into IP packets having a destination IP address of 191.170.0.4 and wraps the IP packets into frames having a destination MAC address of 00:c0:05:00:13:b0. Because this MAC address corresponds to NIC 150, the intermediate computer 120 receives the frames. The intermediate computer 120 retransmits these frames to the node 128 using a destination MAC address of 00:c0:05:01:10:6a.

According to an aspect of the invention, if a source node and a destination node are on the same segment, the communication program 152 refrains from retransmitting ARP requests received from the source node. For example, if the node 124 sends an ARP request to ascertain the MAC address of the node 126, the node 124 responds directly to the node 126. If forwarding information for the node 126 is available in the data structure 154, then the communication program 152 can determine that the source and destination nodes are on the same segment, since the forwarding information tells the communication program 152 that the node 126 is located on the segment to with the NIC 146 is connected, and since the ARP request received from the node 124 was also received via the NIC 146. The communication program 152 would therefore refrain from sending modified versions of the ARP request.

Continuing with the previous example, if no forwarding information is available for the destination node, the communication program 152 may still send modified ARP requests over the other network segments, but no node will respond. For example if node 124 sends an ARP request for the MAC address of node 126, the communication program 152 may send a modified ARP requests over segments 134 and 136. However, nodes 128 and 130 will not respond since the IP address specified in the ARP response does not match that of node 128 or 130.

It will be noted from the forgoing description and examples that each network node only needs to send broadcast network frames and network frames specifying a destination MAC address for a network device located on its network segment. Accordingly, the NICs on the intermediate computer 120 do not need to have the ability to receive network frames specifying a MAC address other than its own. In other words, the NICs on the intermediate computer 120 do not need to operate in a so-called "promiscuous receive" mode. In addition, each NIC on the intermediate computer 120 only needs to have the ability to send broadcast network frames and network frames specifying its own MAC address as the source. Thus, the NICs on the intermediate computer 120 need not be capable of sending an arbitrary source addresses.

Figure 5:
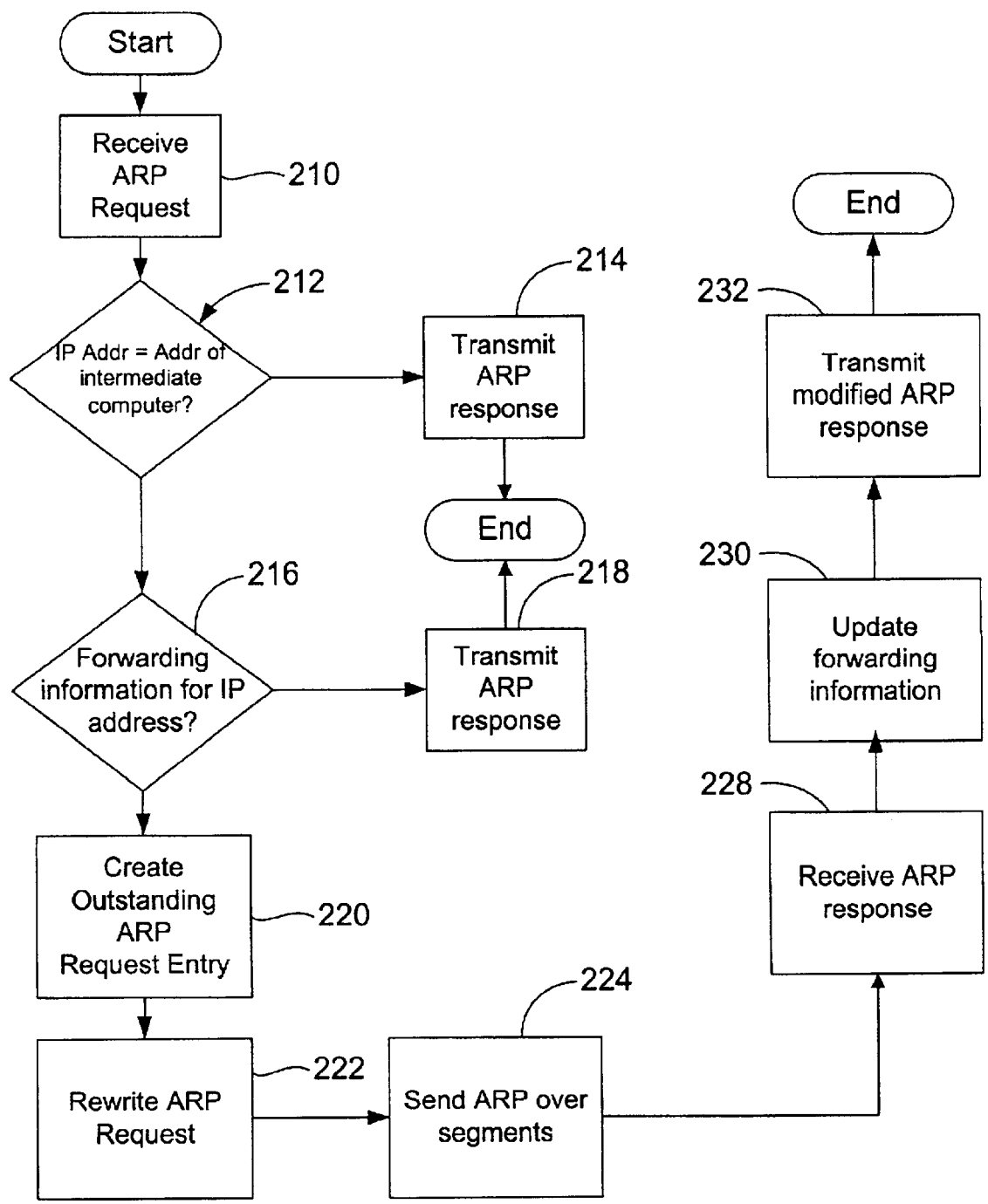
FIG. 5 is a flowchart outlining steps of an example procedure that may be followed in an embodiment of the invention.

An example of a process that may be employed by the communication program 152 in facilitating communication between network nodes that are on different segments is shown in FIG. 5 and will be described with appropriate reference to FIG. 3. At step 210, the communication program 152 receives an ARP request that is passed up from one of the NICs 146, 148 or 150. At step 212, the communication program 152 compares the specified destination IP address in the ARP packet with the IP address of the intermediate computer 120. If they are the same, then the process moves to step 214, at which the communication program 152 sends an ARP response to the node from which the ARP request originated. The ARP response maps the IP address of the intermediate computer 120 to the MAC address of the NIC linked to the segment on which the ARP request originated. If, at step 212, the communication program 152 determines that the specified destination IP address does not match that of the intermediate computer 120, then the process moves to step 216.

At step 216, the communication program 152 attempts to locate, in the first data structure 154, forwarding information for the destination IP address specified in the ARP request. If the communication program 152 finds forwarding information for the destination IP address in the first data structure 154, the process moves to step 218. At step 218, the communication program sends an ARP response over the segment from which the ARP requested originated. The ARP response maps the destination IP address specified in the ARP request to the MAC address of the NIC of the intermediate computer 120 from which the ARP request was received.

If, at step 216, the communication program 152 determines that forwarding information does not exist for the specified destination node, the process moves to step 220, at which an outstanding ARP request entry is created in the second data structure 156. This entry contains the source IP address, source MAC address and destination IP address as specified in the ARP request. This information is used by the communication program 152 to forward a response ARP packet once the destination MAC address is known.

At step 222, the communication program 152 creates multiple modified versions of the ARP request packet. Each version includes a source MAC address corresponding to a different NIC on the intermediate computer 120. The communication program 152 creates a modified version of the ARP request packet for each NIC, except for the NIC linked to the network segment from which the ARP request originated. At step 224, each modified ARP request is sent over a network segment via the NIC having the source MAC address in the ARP request packet.

At step 228, the communication program 152 receives the response from the network node having the destination network address specified in the ARP request. At step 230, the communication program 152 updates the forwarding information in the first data structure 154 by adding the IP and MAC address of the destination node along with the NIC number on which the destination node is located. At step 232, the communication program 152 sends an ARP response is sent to the node from which the ARP request originated (the source node). The ARP response maps the MAC address of the NIC linked to segment to which the source node is linked with the destination IP address specified in the original ARP request. The process then ends.

According to another aspect of the invention, the communication program 152 (FIG. 3) may also help facilitate a request from a node of the network 122 for an IP address. When the node is first turned on and/or first linked to a segment of the network 122, the node may not have an IP address. To obtain an IP address, the network node sends a discovery packet via the Dynamic Host Configuration Protocol (DHCP). The discover packet includes the MAC address of the node requesting the IP address along with a transaction identifier (XID), which is typically a random number. The discover packet is then wrapped in a network frame containing a source MAC address of the requesting node and a destination MAC of address ff:ff:ff:ff:ff:ff, identifying the frame as a broadcast network frame. A DHCP server that receives the discover packet responds to the requesting computer with an "offer" containing an IP address. The requesting node can respond to the "offer" with a "request" for that IP address. The DHCP server then responds with an "ack" or "acknowledgement" signifying to the requesting node that it is now identified by the IP address contained in the "offer."

An example of how the communication program 152 of the present invention may facilitate this process will be described. Referring again to FIG. 3, when the intermediate computer 120 receives a DHCP discover packet, the program 152 modifies the packet and retransmits the modified packet over each network segment other than the segment over which the original packet was received. For example, if the intermediate computer receives a DHCP discover packet from node 124 over segment 132, modified DHCP discover requests will be sent over segments 134 and 136. The modified packets retain the original XID. The communication program 152 also keeps track of the pending DHCP requests according to their XID numbers. The MAC address of the modified packets are changed so that they match the NIC over which the modified packet is sent. For example, a DHCP discover packet from the node 124 includes the XID number and a MAC address of 00:5f:3d:22:35:1a. The communication program 152 retransmits the DHCP discover packet over segments 134 and 136. The retransmitted discover packets are modified, however, to include the MAC address of the intermediate computer NIC linked to the respective network segment. For example, the retransmitted DHCP discover packet sent over segment 134 includes a MAC address of 00:2f:55:23:ff:ce.

The DHCP server (not shown) transmits an offer back to the intermediate computer 120. The program 152 modifies the "offer" packet to include the MAC address of the requesting computer. This is done because the originating computer, in accordance with the DHCP protocol, expects reply packets to bear its MAC address, as originally transmitted. The communication program 152, in turn, relays the DHCP "offer" packet to the requesting node based on pending DHCP transaction information. The pending DHCP transaction information includes the XID, MAC address and identification of the intermediate computer NIC that received the original discover packet.

In a similar manner, the requesting node sends a request for the offered IP address to the intermediate computer which in turn relays the packet to the DHCP server, again, after modifying the MAC address. The "ack" or "acknowledgement" is likewise sent from the DHCP server to the intermediate computer where it is relayed to the requesting node. This method allows a node to communicate with a DHCP server on a different segment in such a way the DHCP server and requesting node appear to be on the same network segment.

It can thus be seen that a new and useful method and system for facilitating communication between nodes on different segments of a network has been provided. In view of the many possible embodiments to which the principles of this invention may be applied, it should be recognized that the embodiments described herein with respect to the drawing figures is meant to be illustrative only and should not be taken as limiting the scope of invention. For example, those of skill in the art will recognize that the elements of the illustrated embodiments shown in software may be implemented in hardware and vice versa or that the illustrated embodiments can be modified in arrangement and detail without departing from the spirit of the invention. Therefore, the invention as described herein contemplates all such embodiments as may come within the scope of the following claims and equivalents thereof.

What is claimed is:

1. In a network comprising a plurality of segments and at least a first and a second node, the first and second nodes each being included in different respective segments of the plurality of segments, a method of facilitating communication between nodes on different segments of a network, the method comprising:

at a computer in communication with the first and second nodes via the respective segments in which the first and second nodes are included, receiving a request for a hardware address of the second node, the request being received as a broadcast from the first node; and sending, to the first node, a response to the request, the response comprising a hardware address of the computer and a network address of the second node, thereby enabling the first node to communicate with the second node as if the first and second nodes are on the same segment of the network.

2. A computer-readable medium having stored thereon computer-executable instructions for performing the method of claim 1.

3. The method of claim 1 wherein the request includes a network address of the second node and, at the computer in communication with the first and second nodes, the hardware address of the computer of the second node is determined from a data structure comprising network addresses and their corresponding hardware address.

4. The method of claim 1 wherein the request includes a network address of the second node and, at the computer in communication with the first and second nodes, the hardware address of the second node is determined by modifying the request received from the first node to include a hardware address of the computer and relaying the modified request over at least the segment including the second node.

5. The method of claim 4 wherein the second node responds to the computer with the hardware address of the second node.

6. The method of claim 1 wherein at least one segment of the plurality of segments comprises a wireless link.

7. The method of claim 1 wherein the respective segments for the first computer and second computer are different types.

8. The method of claim 1 wherein the request for the hardware address is an ARP request.

9. The method of claim 1 wherein the second node has a network interface and the hardware address of the second node is a MAC address, the MAC address being stored in the network interface.

10. The method of claim 1 wherein the first node maintains a data structure, the data structure mapping IP addresses of network nodes to their respective hardware address and wherein, after receiving the response from the computer, the first node updates the data structure to map the network address of the second node to the hardware address of the computer.

11. A method of facilitating communication between nodes on different segments of a network, the method comprising:
   at an intermediate computer linked to a first network segment and a second network segment,
   receiving an ARP message from a first computer on the first network segment, the ARP message comprising a source MAC address and a first source IP address, the first source IP address having the value of an IP address of the first computer;
   changing the value of the source MAC address in the ARP message from a MAC address of the first computer to a MAC address of the intermediate computer to create a modified ARP message;
   transmitting the modified ARP message over the second network segment;
   receiving a response from a second computer on the second network segment, the response comprising a MAC address of the second computer and a second source IP address, the second source IP address having the value of an IP address of the second computer;
   changing the value of the MAC address of the response message from a MAC address of the second computer to a MAC address of the intermediate computer to create a modified response message; and
   transmitting the modified response message over the first network segment to the first computer to enable the first computer to communicate with the second computer as if the first and second computers are on the same network segment.

12. A computer-readable medium having stored thereon computer-executable instructions for performing the method of claim 11.

13. The method of claim 11, wherein, after receiving the ARP message from the first computer, the source MAC address and the first source IP address are stored in a data structure and wherein the intermediate computer uses the data structure to send a response message to the first computer.

14. The method of claim 13 wherein the data structure is organized as a table.

15. The method of claim 11 wherein at least one of the first and second network segments is a wireless link.

16. The method of claim 11, wherein the intermediate computer has a first network interface linking the intermediate computer to the first network segment and a second network interface linking the intermediate computer to the second network segment and wherein when the intermediate computer changes the source MAC address in the ARP message to a MAC address of the intermediate computer, the MAC address of the intermediate computer corresponding to the second network interface.

17. The method of claim 16 wherein, when the intermediate computer changes the value of the MAC address of the response message to a MAC address of the intermediate computer, the MAC address of the intermediate computer corresponding to the first network interface.

18. A system for facilitating communication between nodes of different segments of a computer network, the system comprising:
   a computer;
   at least a first network interface card and a second network interface card coupled to the computer, the first network interface card being linked to a first segment of the computer network and the second network interface card being linked to a second segment of the computer network;
   one or more programs executing on the computer for performing the steps of:
      receiving a request from a first node of the computer network via the first segment and the first network interface card, wherein the request is for a hardware address of a second node of the computer network, the second node being communicatively linked to the computer via the second segment and the second network interface card, and wherein the request includes the hardware address of the first node as the source hardware address and the IP address of the first node as the source IP address;
      modifying the request by changing the source hardware address to that of the second network interface card while leaving the source IP address unchanged; and
      transmitting the modified request to the second node via the second network interface card and the second segment.

19. The system of claim 18, wherein the one or more programs executing on the computer further perform steps comprising:
   receiving a response to the modified request from the second node via the second segment and the second network interface card, the response including the hardware address of the second node as the source hardware address and the IP address of the second node as the source IP address;
   modifying the response by changing the source hardware address to that of the first network interface card while leaving the source IP address unchanged; and
   transmitting the modified response to the first node via the first network interface card and the first segment.

20. The system of claim 19, wherein the one or more programs perform further steps comprising:
   keeping track of the association between the hardware address of the first node and the IP address of the first node;
   keeping track of the association between the hardware address of the second node and the IP address of the second node; and
   relaying messages between the first and second nodes using the hardware addresses of the first and second network interface cards respectively so as to make it appear to the first and second nodes that they are communicating with one another over a single network segment.

* * * * *